US009491546B2

(12) United States Patent
Lin

(10) Patent No.: US 9,491,546 B2
(45) Date of Patent: Nov. 8, 2016

(54) ELECTRONIC DEVICE AND AUDIO-DATA TRANSMISSION METHOD

(71) Applicant: Acer Incorporated, New Taipei (TW)

(72) Inventor: Shih-Hao Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 85 days.

(21) Appl. No.: 14/554,442

(22) Filed: Nov. 26, 2014

(65) Prior Publication Data
US 2015/0271600 A1 Sep. 24, 2015

(30) Foreign Application Priority Data

Mar. 19, 2014 (TW) .............................. 103110244 A

(51) Int. Cl.
H03G 5/00 (2006.01)
H04R 3/00 (2006.01)
H04R 3/04 (2006.01)
H04B 11/00 (2006.01)

(52) U.S. Cl.
CPC ................. H04R 3/04 (2013.01); H04B 11/00 (2013.01); H04R 2430/00 (2013.01)

(58) Field of Classification Search
None
See application file for complete search history.

(56) References Cited

U.S. PATENT DOCUMENTS 9,215,539 B2 * 12/2015 Kim ....................... H04R 29/00
2002/0140549 A1 * 10/2002 Tseng ................. B60H 1/00642
340/426.24
2009/0067289 A1 3/2009 Lee et al.
2013/0227595 A1 * 8/2013 Nielsen ................. H04H 60/45
725/11
2014/0056172 A1 2/2014 Lee et al.

OTHER PUBLICATIONS

Chinese language office action dated Oct. 20, 2015, issued in application No. TW 103110244.
Chen, B.; Yamaha gets Fuji TV into InfoSound, to bring acoustic data transmission apps to tablets and phones; Jun. 15, 2012; pp. 1-4. English language translation of abstract of article ("Yamaha gets Fuji TV into InfoSound, to bring acoustic data transmission apps to tablets and phones").
EP Office Action dated Jul. 23, 2015 in corresponding EP application (No. 14196802.4-1860).

* cited by examiner

Primary Examiner — Muhammad N Edun
(74) Attorney, Agent, or Firm — McClure, Qualey & Rodack, LLP

(57) ABSTRACT

An audio-data transmission method for an electronic device is provided. The method includes determining whether or not a plurality of external data sounds and a plurality of external identification sounds are received. The external data sound and the external identification sound are respectively on a data frequency range and an identification frequency range that is different from the data frequency range. The external identification sound includes N sounds of predetermined frequencies wherein N is a positive integer larger than one. When not receiving the external data sound and the external identification sound simultaneously transmitted by at least one external electronic device, the electronic device transmits a plurality of data sounds and a plurality of identification sounds. The data sound and the identification sound are respectively within the data frequency range and the identification frequency range. The identification sound includes the sounds of predetermined frequencies.

9 Claims, 4 Drawing Sheets

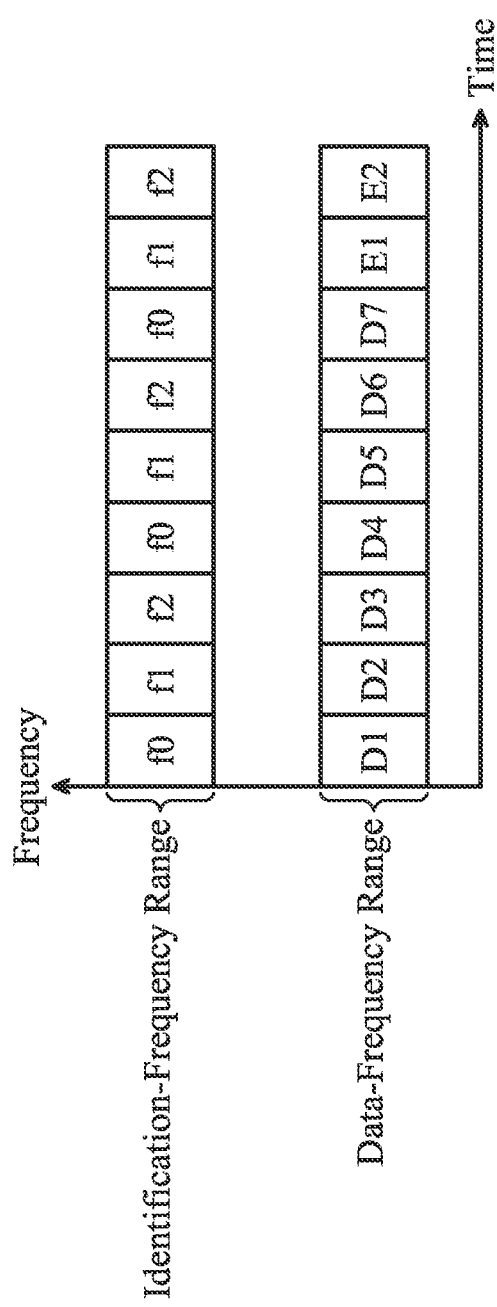

ELECTRONIC DEVICE AND AUDIO-DATA TRANSMISSION METHOD

CROSS REFERENCE TO RELATED APPLICATIONS

This Application claims priority of Taiwan Patent Application No. 103110244, filed on Mar. 19, 2014, the entirety of which is incorporated by reference herein.

BACKGROUND OF THE INVENTION

1. Field of the Invention

The present invention relates to communication technology, and in particular to an audio-data transmission method and an electronic device for transmitting data by sounds.

2. Description of the Related Art

As portable electronic devices become more popular, modern users increasingly depend on audio-data transmission. Current audio-data transmission technology is mainly used for one device to communicate with another device. The speaker of the transmitting terminal transmits the audio-data signal, and the receiving terminal receives it and executes a demodulation and decoding process. However, when there are several electronic devices transmitting or receiving data, users need to avoid simultaneous transmission to prevent data collision by their own. It takes much time and is not convenient. Therefore, a more efficient audio-data transmission method is needed to automatically solve the problems caused by several electronic devices transmitting data at the same time, and users can transmit or share data more easily.

BRIEF SUMMARY OF THE INVENTION

The present invention provides an audio-data transmission method for transmitting the sounds with a frequency of 18000 Hz to 20000 Hz, which cannot be heard by the human ear, and each electronic device can simultaneously transmit the audio data including the data sounds and the identification sounds. Whether other electronic devices are transmitting their own audio data or not can be determined by the above identification sounds. The audio-data of the electronic device is transmitted while not receiving the identification sounds of other electronic devices. Since only one electronic device can transmit audio data in each period, sound collision can be prevented. Therefore, the audio-data transmission method provided by the present invention solves the problem of operating the electronic device to avoid sound collision by users so that the users can develop audio-data transmission and share data more easily.

The present invention provides an audio-data transmission method utilized on an electronic device. The audio-data transmission method includes determining whether a plurality of external identification sounds are received or not, wherein the external identification sounds are within an identification-frequency range, the external identification sounds include sounds of N predetermined frequencies and N is a positive integer greater than one; and transmitting a plurality of data sounds and a plurality of identification sounds by the electronic device when the external identification sounds are not received, wherein the data sounds and the identification sounds are on the data-frequency range and the identification-frequency range respectively, and the identification sounds include the sounds on predetermined frequencies.

The present invention provides an electronic device utilized for transmitting audio data. The electronic device includes an audio receiving unit, a control unit and an audio transmitting unit. The control unit is utilized to determine whether a plurality of external data sounds and a plurality of external identification sounds are received or not, wherein the external data sounds and the external identification sounds are respectively on a data-frequency range and on an identification-frequency range which is different from the data-frequency range, and the external identification sounds include sounds of N predetermined frequencies, wherein N is a positive integer greater than one. The audio transmitting unit is utilized to transmit a plurality of data sounds and a plurality of identification sounds when the control unit determines that the external data sounds and the external identification sounds are not received. The data sounds and the identification sounds are on the data-frequency range and the identification-frequency range respectively, and the identification sounds include the sounds of the predetermined frequencies.

The present invention provides an audio-data transmission method utilized on an electronic device. The audio-data transmission method includes transmitting a plurality of data sounds and a plurality of identification sounds by the electronic device when a plurality of external data sounds and a plurality of external identification sounds are not received. The data sounds and the identification sounds are on a data-frequency range and an identification-frequency range respectively which is different from the data-frequency range, and the identification sounds include sounds of N predetermined frequencies and N is a positive integer greater than one.

BRIEF DESCRIPTION OF THE DRAWINGS

The present invention can be more fully understood by reading the subsequent detailed description and examples with references made to the accompanying drawings, wherein:

FIG. 3 is a schematic diagram of transmitting the data sound and the identification sound according to an embodiment of the present invention;

FIG. 4 is a schematic diagram of the audio-data transmission method according to an embodiment of the present invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
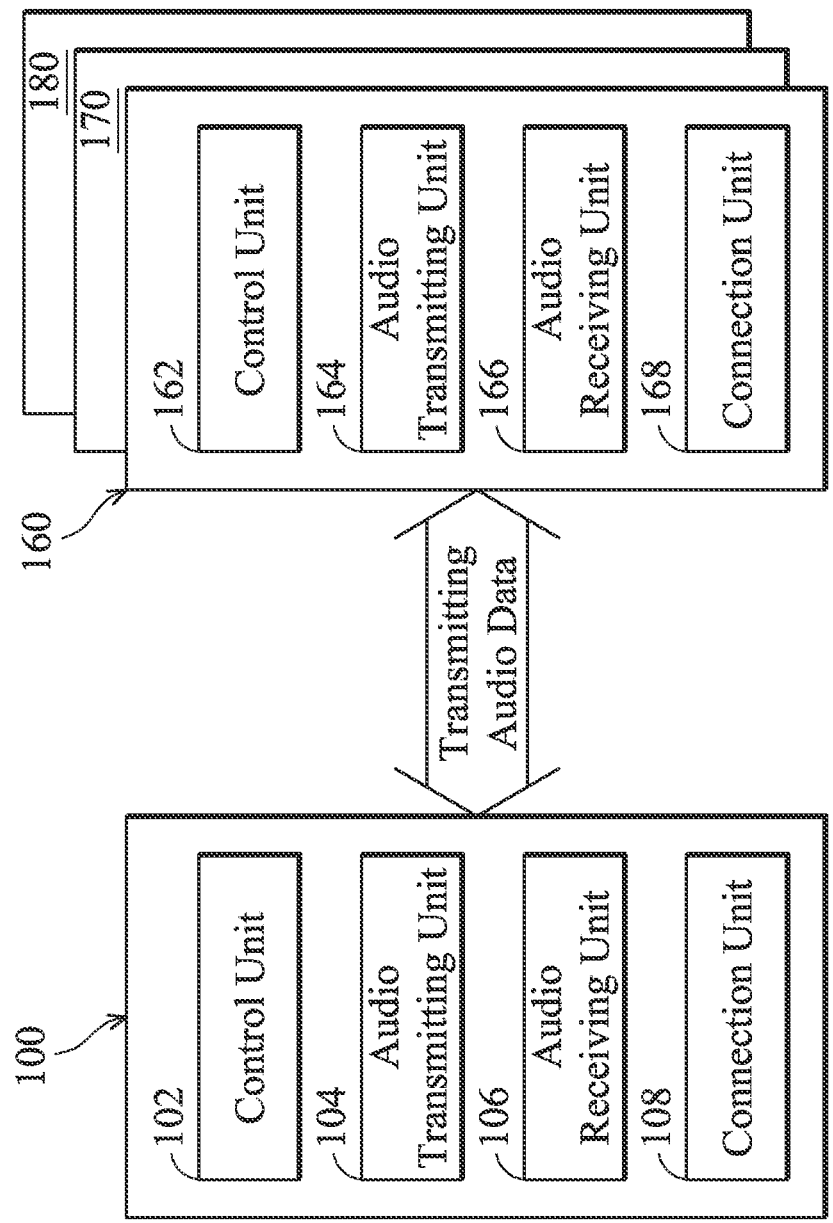
FIG. 1 is a schematic diagram of the electronic device and the external electronic device of an embodiment of the present invention.

FIG. 1 is a schematic diagram of the electronic device 100 and the external electronic devices 160, 170 and 180 of an embodiment of the present invention. The electronic device 100 includes the control unit 102, the audio transmitting unit 104 and the audio receiving unit 106. The external electronic devices 160, 170 and 180 include the control unit 162, the audio transmitting unit 164 and the audio receiving unit 166 respectively. The electronic device 100 and the external electronic devices 160, 170 and 180 can be internet servers, desktop computers, laptop computers, tablet computers, smartphones and/or any other apparatuses capable of wireless communication, and are not limited thereto. In the embodiments of the present invention, each unit can be hardware including a chip, controller, storage device and/or any other necessary circuits.

For example, the control units 102 and 162 can include a digital signal processor (DSP), a microcontroller (MCU) or a number of parallel processing units relating the parallel processing environment. In addition, the audio transmitting units 104 and 164 can be speakers or loudspeakers to transmit sounds. The audio receiving units 106 and 166 can be microphones to receive sounds. In another embodiment, the electronic device 100 and the external electronic device 160 further include the connection units 108 and 168 respectively. The connection units 108 and 168 can be the wireless-communication chips or their relating entities in accordance with the present invention to develop wireless communication based on the communication protocol. For example, the communication protocol may be GSM, GPRS, EDGE, UMTS, W-CDMA, CDMA2000, TD-CDMA, Bluetooth, NFC, WiF, Wi-Fi Direct, WiMAX, LTE, LTE-A or TD-LTE.

In one embodiment, the audio transmitting unit 104 is utilized to transmit the data sound and the identification sound of the electronic device 100, and the audio receiving unit 106 is utilized to receive the external data sound and/or the external identification sound from the external electronic devices 160, 170 and/or 180. In addition, the identification sound and the external identification sound include N sounds of predetermined frequencies, and N is the positive integer which is greater than one. It should be noted that the frequencies of the data sound and the external data sound are on the data-frequency range, and the frequencies of the identification sound and the external identification sound (i.e. the predetermined frequencies) are on the identification-frequency range which is different from the data-frequency range. For example, the identification-frequency range is higher than the data-frequency range. Specifically, the data sound and the external data sound include the data respectively transmitted by the electronic device 100 and the external electronic devices 160, 170 and/or 180. The identification sound and the external identification sound are utilized for labeling to indicate that the electronic device 100 and the external electronic devices 160, 170 and/or 180 are transmitting their audio data.

Specifically, the control unit 102 is utilized to determine whether the audio receiving unit 106 receives an external data sound and an external identification sound transmitted by at least one external electronic device 160, 170 or 180 or not. When the control unit 102 determines that the audio receiving unit 106 does not receive the external data sound and the external identification sound transmitted by at least one external electronic device 160, 170 or 180, the audio transmitting unit 104 transmits the data sound and the identification sound. In other words, when the electronic device 100 receives the external identification sound transmitted by the external electronic device 160, 170 and/or 180, it can determine that the external electronic device 160, 170 and/or 180 are transmitting the audio data and preventing the electronic device 100 and the external electronic device 160, 170 and/or 180 from transmitting the audio data at the same time, which would result in problems of sound collision and errors in the transmitting or receiving of the audio data.

Figure 2:
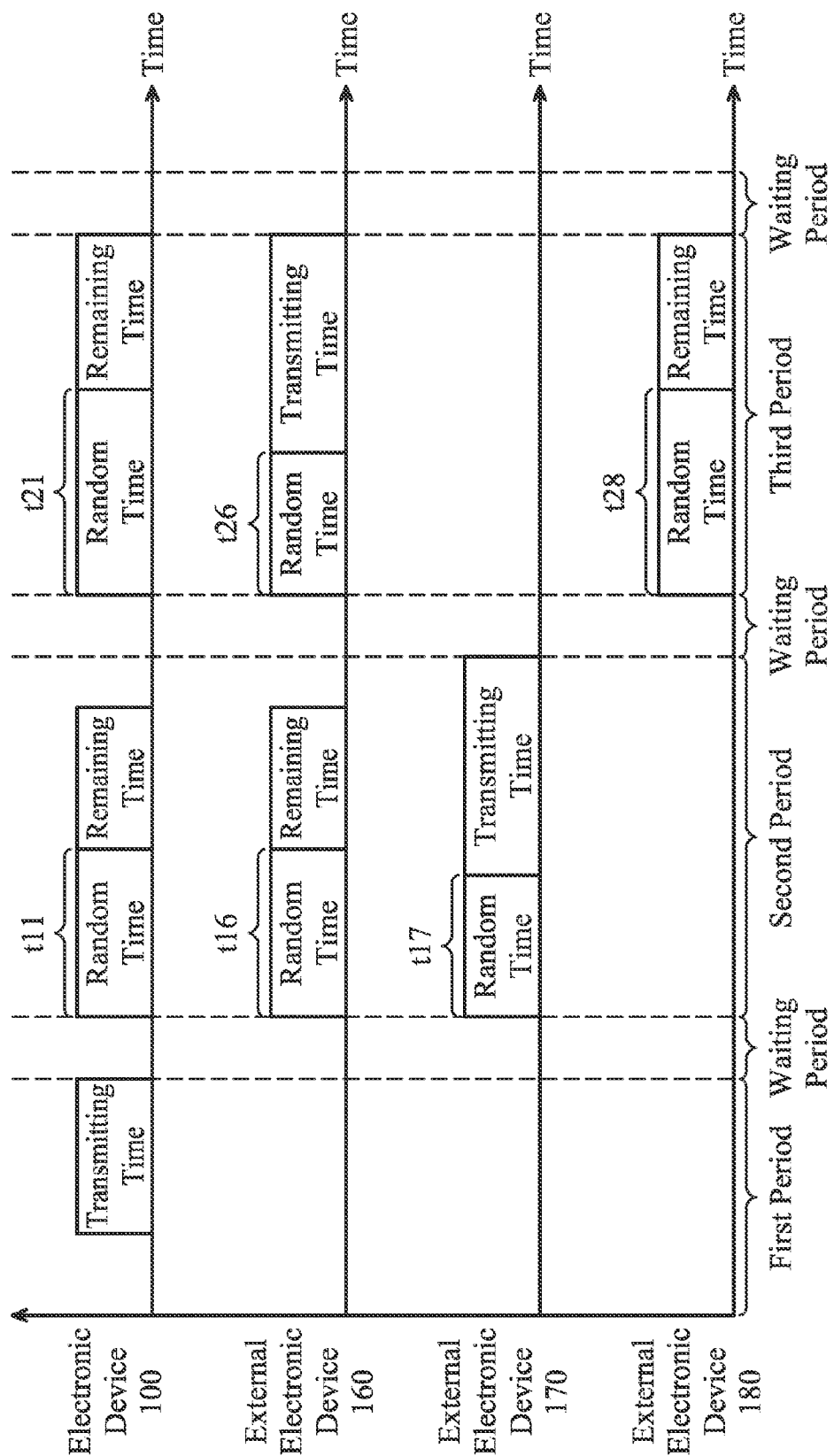
FIG. 2 is a schematic diagram of the audio-data transmission method according to an embodiment of the present invention.

FIG. 2 is a schematic diagram of the audio-data transmission method according to an embodiment of the present invention. As shown in FIG. 2, in the first period, the electronic device 100 transmits the audio data including the data sound and the identification sound at the transmitting time. The external electronic devices 160 and 170 receive the identification sound from the electronic device 100 and determine that the electronic device 100 is transmitting the audio data. Therefore, the external electronic devices 160 and 170 do not transmit their audio data in the first period. After the electronic device 100 finishes the transmission and enters the waiting period, the electronic device 100 and the external electronic devices 160, 170 and 180 are all in the waiting period and do not transmit any audio data. Afterwards, in the second period, the electronic device 100 and the external electronic devices 160 and 170 are at the random time t11, t16 and t17, respectively. For example, the random times t11, t16 and t17 are generated by the control units of the electronic device 100 and the external electronic devices 160 and 170.

As shown in FIG. 2, because the random time t17 of the external electronic device 170 is less than the other two random times t11 and t16, the external electronic device 170 starts transmitting its audio data after the end of the random time t17, and enters the waiting period after finishing the transmission. During the second period, the electronic device 100 and the external electronic device 160 are at the remaining time respectively after the end of the random times t11 and t16, and then enter the waiting period. In addition, during the third period, only the external electronic device 160 with the shortest random time t26 can transmit its audio data, and the electronic device 100 and the external electronic device 180 are both at the remaining time. It can be known that each electronic device transmits its identification sound in each period, and other electronic devices can obtain the information about the current status of audio data transmission by the identification sound. The audio data can only be transmitted when the device does not receive the identification sound from other electronic devices. Therefore, only one electronic device can transmit the audio data in each period to avoid the sound collision.

FIG. 3 is a schematic diagram of transmitting the data sound and the identification sound according to an embodiment of the present invention. In this embodiment, the identification sound includes three sounds at predetermined frequencies of f1, f2 and f3 (i.e. N is equal to three). As shown in FIG. 3, the identification sound and the data sound are transmitted in the identification-frequency range and the data-frequency range respectively. The frequency of the identification-frequency range is higher than the frequency of the data-frequency range. In other words, the identification sound is transmitted within the frequency of the identification-frequency range, and the data sound is transmitted within the frequency of the data-frequency range. For example, the data-frequency range is about 18000 Hz to 19700 Hz, and the identification-frequency range is about 19700 Hz to 20000 Hz. For further illustration, the three predetermined frequencies f1, f2 and f3 of the identification sounds are about 19700 Hz, 19800 Hz and 19900 Hz.

In one embodiment, as shown in FIG. 3, the frequencies of each data sound D1~D7 and the ending sound E1~E2 are in the data-frequency range. The electronic device 100 periodically transmits the identification sounds of predetermined frequencies f0, f1 and f2, and the identification sounds of predetermined frequencies f0, f1 and f2 are corresponding to the data sounds D1~D7 and the ending sounds E1~E2 and are transmitted with the data sounds D1~D7 and the ending sounds E1~E2 at the same time. In other words, the audio transmitting unit 104 transmits the identification sounds periodically and repeatedly in the sequence of the predetermined frequencies f0, f1 and f2. In addition, the identification sound of the predetermined frequency f0 is transmitted in correspondence with the data sound D1, and the identification sound of the predetermined frequency f1 is transmitted in correspondence with the data sound D2, and so forth. The method of transmitting the external data sound and the external identification sound by the external electronic devices 160, 170 and 180 are illustrated above, and will not be repeated again.

It should be noted that in this embodiment, the identification sound includes three predetermined frequencies (i.e. N is equal to three), therefore, the number of the data sounds transmitted by the audio transmitting unit 104 is the multiple of three (i.e. N×M, and M is a positive integer). Accordingly, each electronic device can enter the waiting period and the random time simultaneously after the data sounds are transmitted. If the number of the data sounds is not the multiple of three, at least one ending sound will be transmitted after the data sound so that the total number of the data sounds and the ending sound is the multiple of three. As shown in FIG. 3, since there are seven data sounds D1~D7, two ending sounds E1 and E2 are added.

It should be noted that the identification sound including three predetermined frequencies f0, f2 and f2 has the advantage of detecting the identification sound in the most efficient way. If the number of the predetermined frequencies is too few, it will be easily mixed with the noise or the background sounds of the environment, and detecting the identification sound becomes difficult. If the number of the predetermined frequencies is too many, the range of higher frequencies will be needed and the complexity of designing the product is also increased. In another embodiment, the identification sound includes two predetermined frequencies f0 and f1. The audio transmitting unit 104 transmits the identification sounds periodically in the sequence of the predetermined frequencies f0 and f1 and in correspondence with the data sound and/or the ending sound, and transmits the identification sounds in correspondence with the data sound and/or the ending sound simultaneously. In another embodiment, the identification sound includes four predetermined frequencies f0, f1, f2 and f3. The audio transmitting unit 104 transmits the identification sound periodically in the sequence of the predetermined frequencies f0, f1, f2 and f3 and in correspondence with the data sound and/or the ending sound, and transmits the identification sound in correspondence with the data sound and/or the ending sound simultaneously.

In order to prevent the problem of the sound collision, in one embodiment, after the audio receiving unit 106 receives the external identification sound and the external data sound, the control unit 102 determines whether the external identification sound meets with or conforms to the collision-determination mode or not for determining whether at least two of the external electronic devices 160, 170, 180 and/or the electronic device 100 simultaneously transmit the external identification sound and/or the identification sound or not. When the control unit 102 determines that the external identification sound does not meet with the collision-determination mode, it determines that at least two of the external electronic devices 160, 170, 180 and/or the electronic device 100 simultaneously transmit the external identification sound and/or the identification sound, and the electronic device 100 stops transmitting the identification sound and the data sound. The collision-determination mode will be illustrated in detail below.

Table 1 illustrates the collision-determination mode according to an embodiment of the present invention.

TABLE 1

| Collision-Determination Mode | | | |
|---|---|---|---|
| First Mode | X | X | f0 |
| Second Mode | X | f0 | f1 |
| Third Mode | f0 | f1 | f2 |
| Fourth Mode | f1 | f2 | f0 |
| Fifth Mode | f2 | f0 | f1 |
| Sixth Mode | f1 | f2 | X |
| Seventh Mode | f2 | X | X |
| Eighth Mode | X | X | X |

As shown in Table 1, in this embodiment, the identification sound includes three predetermined frequencies f0, f1 and f2, and X represents that the audio receiving unit 106 does not receive the identification sounds of the above predetermined frequencies f0, f1 and f2. On the one hand, when the external identification sound received by the audio receiving unit 106 belongs to any one of the eight modes listed in Table 1, the control unit 102 determines that the external identification sound meets with the collision-determination mode, which indicates that there are no at least two of the external electronic devices 160, 170, 180 and/or the electronic device 100 simultaneously transmit the external identification sound and/or the identification sound. On the other hand, when the external identification sound received by the audio receiving unit 106 does not belong to any one of the eight modes listed in Table 1 (for example, the identification sound of the predetermined frequencies f0, f1 and f0 are received, but the present invention is not limited thereto), the control unit 102 determines that the external identification sound does not meet with the collision-determination mode which indicates that at least two of the external electronic devices 160, 170, 180 and/or the electronic device 100 are simultaneously transmitting the external identification sound and/or the identification sound, and the electronic device 100 stops transmitting the identification sound and the data sound. Therefore, the problem of the sound collision can be further solved by the control unit 102 determining whether the external identification sound meets with the collision-determination mode or not.

FIG. 4 is a schematic diagram of the audio-data transmission method according to an embodiment of the present invention. In one embodiment, the audio data transmitted by the audio transmitting unit 104 is a package. The content of the package includes the starting sound, the transmission type, the transmitter address (MAC), the receiver address, the status of the package, the data and the ending sound. The transmitter and the receiver mentioned above can be the electronic device 100 or the external electronic devices 160, 170 and 180. Specifically, the transmission type includes three application modes of broadcasting the transmitter address to all of the receivers, broadcasting the transmitter address to all of the receivers and also receiving the acknowledge message, and transmitting the transmitter address to specific receivers and also receiving the acknowledge message. The package status is utilized to indicate that the package is a sub-package of another large package, and indicate the sequence of the sub-package within the large package. In addition, the content of the data sound and the ending sound are illustrated above and will not be repeated here.

Figure 5:
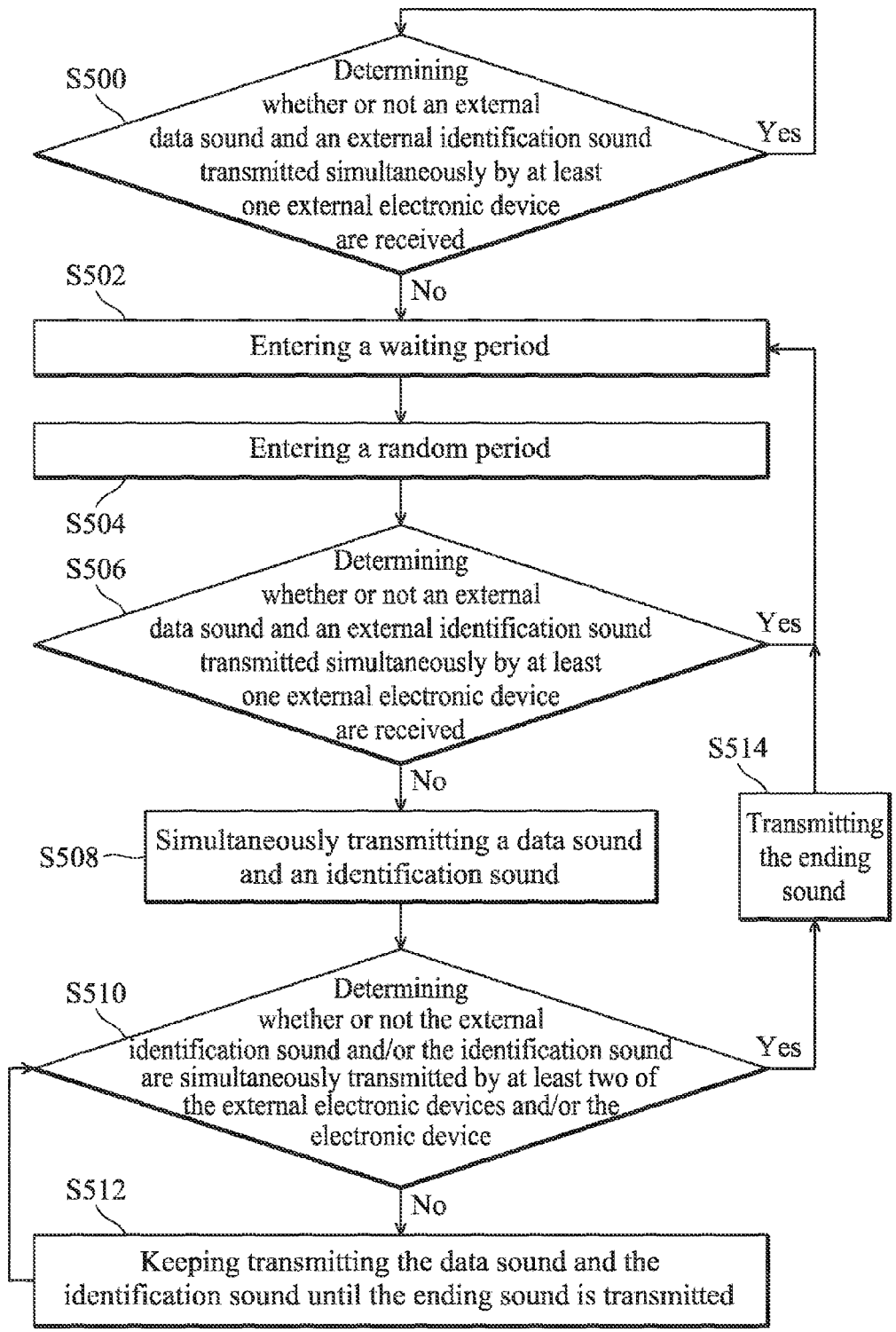
FIG. 5 is a flow chart of the audio-data transmission method according to an embodiment of the present invention.

FIG. 5 is a flow chart of the audio-data transmission method according to an embodiment of the present invention. In step S500, the control unit 102 of the electronic device 100 determines whether an external data sound and an external identification sound transmitted simultaneously by at least one external electronic device 160, 180 and 180 are received or not. If the control unit 102 determines that the external data sound and the external identification sound transmitted simultaneously by at least one external electronic device 160, 180 and 180 are received, step S500 is executed again. If the control unit 102 determines that the external data sound and the external identification sound transmitted simultaneously by at least one external electronic device 160, 180 and 180 are not received, step S502 is executed and the electronic device 100 enters a waiting period. After the waiting period is ended, step S504 is executed and the electronic device 100 enters the random time. Afterwards, step S506 is executed and the control unit 102 determines that whether the external data sound and the external identification sound transmitted simultaneously by at least one external electronic device 160, 180 and 180 are received or not.

If the control unit 102 determines that the external data sound and the external identification sound transmitted simultaneously by at least one external electronic device 160, 180 and 180 are received, step S502 is executed again. If the control unit 102 determines that the external data sound and the external identification sound transmitted simultaneously by at least one external electronic device 160, 180 and 180 are not received, step S508 is executed that the audio transmitting unit 104 of the electronic device 100 simultaneously transmits a data sound and an identification sound. Afterwards, step S510 is executed that the control unit 102 determines whether the external identification sound and/or the identification sound are simultaneously transmitted by at least two of the external electronic devices 160, 170, 180 and/or the electronic device 100 or not. On the one hand, if the control unit 102 determines that the external identifications sound and/or the identification sound are not simultaneously transmitted by at least two of the external electronic devices 160, 170, 180 and/or the electronic device 100, step S512 is being executed that the audio transmitting unit 104 keeps transmitting the data sound and the identification sound until the ending sound is transmitted. It should be noted that while step S512 is executed by the audio transmitting unit 104, step S510 is also being executed by the control unit 102 at the same time. On the other hand, if the control unit 102 determines that the external identification sound and/or the identification sound are simultaneously transmitted by at least two of the external electronic devices 160, 170, 180 and/or the electronic device 100, step S514 is executed that the audio transmitting unit 104 transmits the ending sound. Afterwards, step S502 is executed that the electronic device 100 is on the waiting period. The transmission method and the detail content of the identification sound are illustrated before and will not be repeated here.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An audio-data transmission method, utilized on an electronic device, comprising:
   determining whether a plurality of external identification sounds are received or not, wherein the external identification sounds are on an identification-frequency range, the external identification sounds include sounds of N predetermined frequencies and N is a positive integer greater than one;
   transmitting a plurality of data sounds and a plurality of identification sounds by the electronic device when the external identification sounds are not received, wherein the data sounds and the identification sounds are on a data-frequency range and the identification-frequency range respectively, and the identification sounds include the sounds of the predetermined frequencies; and
   after receiving the external data sounds and the external identification sounds, determining whether the identification sounds and/or the external identification sounds are transmitted by at least two of the electronic devices and the at least one external electronic device or not according to the external identification sounds, and stopping the transmission of the identification sounds and the data sounds when the identification sounds and/or the external identification sounds are transmitted by the at least two of the electronic devices and the external electronic devices.

2. The audio-data transmission method as claimed in claim 1, wherein the external identification sounds are transmitted periodically and in correspondence with the external data sounds, and the identification sounds are transmitted periodically and in correspondence with the data sounds.

3. The audio-data transmission method as claimed in claim 2, wherein the number of the external data sounds and the data sounds are N×M and M is a positive integer.

4. An electronic device, utilized for transmitting audio data, comprising:
   an audio receiving unit;
   a control unit, utilized to determine whether a plurality of external data sounds and a plurality of external identification sounds are received or not, wherein the external data sounds and the external identification sounds are respectively on a data-frequency range and on an identification-frequency range which is different from the data-frequency range, and the external identification sounds include sounds of N predetermined frequencies and N is a positive integer greater than one; and
   an audio transmitting unit, utilized to transmit a plurality of data sounds and a plurality of identification sounds when the control unit determines that the external data sound and the external identification sounds are not received by the audio receiving unit, wherein the data sounds and the identification sounds are on the data-frequency range and the identification-frequency range respectively, and the identification sounds include the sounds of the predetermined frequencies, wherein after the audio receiving unit receives the external data sounds and the external identification sounds, the control unit determines whether the identification sounds and/or the external identification sounds are transmitted by at least two of the electronic device and the at least one external electronic device or not according to the external identification sounds, and the audio transmitting unit stops transmitting the identification sounds and the data sounds when the control unit determines that the identification sounds and/or the external identification sounds are transmitted by at least two of the electronic device and the at least one external electronic device.

5. The electronic device as claimed in claim 4, wherein the external identification sounds are transmitted periodically and in correspondence with the external data sounds, and the identification sounds are transmitted periodically and in correspondence with the data sounds.

6. The electronic device as claimed in claim 5, wherein the number of the external data sounds and the data sounds are N×M and M is a positive integer.

7. An audio-data transmission method, utilized on an electronic device, comprising:

transmitting a plurality of data sounds and a plurality of identification sounds by the electronic device when a plurality of external data sounds and a plurality of external identification sounds are not received, wherein the data sounds and the identification sounds are respectively on a data-frequency range and an identification-frequency range which is different from the data-frequency range, the identification-frequency range and the data-frequency range are not overlapped, and the identification sounds include sounds of N predetermined frequencies and N is a positive integer greater than one.

8. The audio-data transmission method as claimed in claim 7, wherein the external identification sounds are transmitted periodically and in correspondence with the external data sounds, and the identification sounds are transmitted periodically and in correspondence with the data sounds.

9. The audio-data transmission method as claimed in claim 7, wherein the number of the external data sounds and the data sounds are N×M and M is a positive integer.

* * * * *